3,113,056
METHOD OF ADJUSTING AN UNSATURATED VAPOUR PRESSURE OF A SUBSTANCE IN A SPACE
Cornelis Zeger van Doorn, Emmasingel, Eindhoven, Netherlands, assignor to North American Philips Company, Inc., New York, N.Y., a corporation of Delaware
Filed July 21, 1961, Ser. No. 125,789
Claims priority, application Netherlands Sept. 1, 1960
8 Claims. (Cl. 148—171)

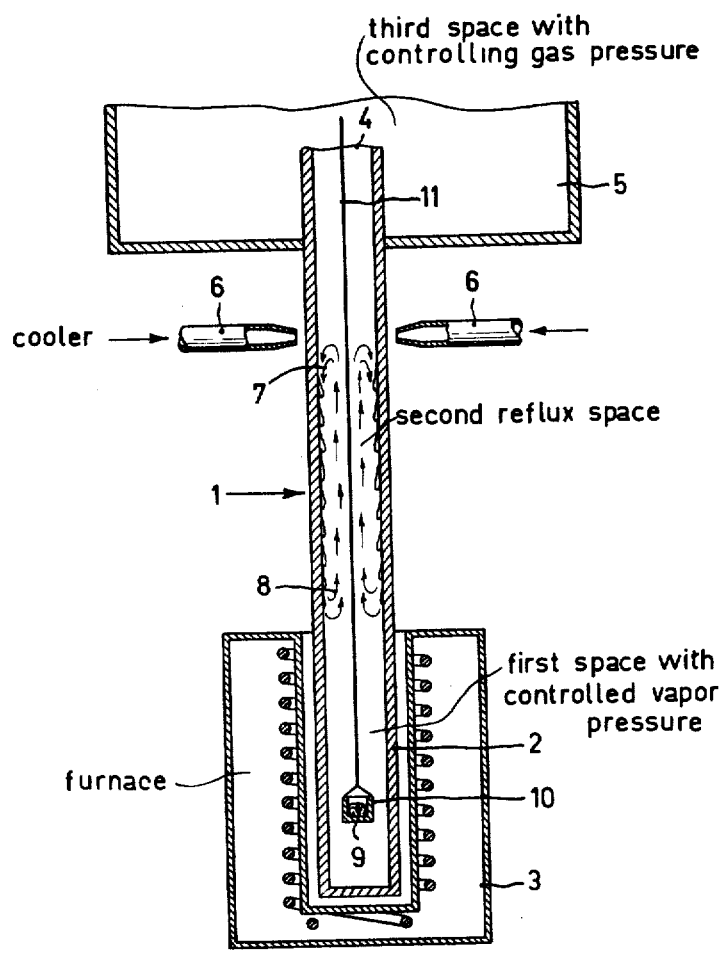

The invention relates to a method of adjusting an unsaturated vapour pressure of a substance in a space.

Such a method may be used in heat treatments of solid materials, which may be fusible, for example semi-conductive materials, in particular semi-conductive compounds containing volatile constituents, such as the chalcogenides of cadmium or lead, in which the volatilisation of such a constituent is counteracted by maintaining the vapour of such a constituent, which at the temperature of the treatment is unsaturated, at a certain pressure.

Such a method has already been suggested, in which two heated spaces are used, which are in communication with one another but otherwise completely enclosed, in which in one heated space a certain unsaturated vapour of a substance is maintained by maintaining an amount of the substance in the solid or liquid state in the other space at a constant temperature below the temperature in the first space such that the pressure of saturated vapour of the substance associated with that constant temperature in the second space is equal to the desired unsaturated vapour pressure in the first space. In this known method, in order to maintain the vapour pressure constant within given limits, the temperature in the second space must be controlled very accurately, since a slight temperature variation of the coldest spot in the two spaces may entail an intense variation of the saturation pressure. Furthermore, one cannot manipulate in the first space from outside while maintaining the relevant unsaturated vapour pressure. If, for example, a body is to be subjected to a heat treatment in the vapour of a volatile component of the material of that body in the first space, the body must be introduced into this space before the treatment, after which both spaces have to be closed. Hence, it is impossible or at least highly difficult to adjust the temperature and the vapour pressure and then to introduce the body to be treated into these spaces and subsequently to remove it therefrom which maintaining said temperature and vapour pressure.

The invention relates particularly to a method of adjusting an unsaturated vapour pressure of a substance in a first space, which pressure exceeds the triple point pressure of that substance. It is an object of the invention, to obviate the above-mentioned difficulties. According to the invention the vapour of said substance is produced in said space and the required pressure adjustment is obtained by bringing this space to a temperature at which the vapour of said substance is unsaturated at the pressure to be adjusted, and by introducing the substance into another space, hereinafter referred to as reflux space, the lower end of which is in open communication with the first space and the upper end of which is in open communication with a third space containing a gas at the pressure to be adjusted. By supplying heat the lower portion of the reflux space and withdrawing heat from the upper portion of the reflux space the substance is entirely evaporated in the lower portion and condensed in the upper portion, the condensate flowing to the lower portion in which it is again entirely evaporated, so that by continuous evaporation and reflux the substance circulates in the reflux space, whereby by pumping action of the rising vapour current the diffusion of gas from the third space towards the first space is counteracted, and any gases which may be present in the first space are conducted away to the third space, while the first space is filled with the unsaturated vapour of the substance.

The first space is completely filled with the vapour of the substance being subjected to the reflux treatment. Since all other gases and vapours are expelled from the first space, the pressure of the vapour in the first space is substantially equal to the pressure of the gas in the third space. By controlling or maintaining constant the gas pressure in the third space, the vapour pressure in the first space can also be controlled or maintained constant. Slight variations of the gas pressure in the third space cause equally slight variations only of the unsaturated vapour pressure in the first space, so that strong fluctuations of this vapour pressure can be readily avoided.

The degree of supply of heat to, and withdrawal of heat from, the reflux space is not critical, however, it must be sufficient to maintain a strong vapour current and to ensure an at least substantially complete condensation in the upper portion and a complete evaporation of the condensate flowing back to the lower portion.

It should be noted that it is known, for example for performing a chemical reaction in a boiling liquid, in a space comprising a flask provided with an open riser pipe, to supply heat to the flask in order to boil the liquid contained therein and to withdraw heat from the riser pipe in order to ensure at least substantially complete condensation of the rising vapour, the condensate flowing back into the flask. In this case, however, saturated vapour in the flask is always involved, the temperature and pressure of which cannot be varied independently of one another, whereas this independent variation can be effected in the method according to the invention.

In the method according to the invention, a reflux space having substantially vertical walls is preferably used. The space is preferably tubular or may comprise a number of tubular portions. The walls preferably are satisfactorily wetted by the condensate in order to ensure an even flowback. Preferably, the first and second spaces are together constituted by a vertical tube closed at the lower end and open at the upper end, the lower end and an adjoining portion of the tube being arranged in a furnace, while the tube is cooled in at least one area above the part inserted into the furnace.

The gas in the third space preferably is a gas or gas mixture which does not, or not appreciably, react with the substance in the reflux space. The temperatrue in the third space is not critical for the method according to the invention and may be room temperature. If atmospheric pressure is to be adjusted, the second reflux space may be in open communication with the ambient atmosphere, so that in this event the ambient atmosphere acts as the third space.

By the method according to the invention, unsaturated vapours of a great many substances may be obtained, inter alia of a number of elements the most suitable of which are, for example, the elements sulphur, mercury, zinc, cadmium, white phosphorus, sodium, potassium, rubidium and caesium. These elements have a comparatively low melting point and at atmospheric pressure a not excessively high boiling point which, however, is considerably higher than their melting point, so that unsaturated vapours of these elements can be obtained at not excessively high temperatures and under a large variety of pressures, including atmospheric pressure. Other substances, for example the element antimony, are suitable for obtaining unsaturated vapours in a comparatively low pressure range, for example of less than 0.5 atmosphere.

An upper limit for the pressure of a substance to be employed is determined in principle by its critical pressure, while the lowest pressure to be used is determined in principle by the triple point pressure, at which solid substance, liquid and saturated vapour can be in equilibrium with one another. Preferably a pressure is used which is at least 10 times the vapour pressure at the melting point of the substance. Furthermore, the pressure is preferably chosen not lower than 0.1 mm. of mercury. Below this pressure it is difficult sufficiently to counteract the diffusion of gas from the third space to the first space.

The method is preferably employed to subject materials, for example semi-conductive materials, to a heat treatment in an unsaturated vapour of a substance. For this purpose, a supply of such a material may be introduced in the first space and be subjected to a heat treatment therein. The first space may be brought to the treating temperature and filled with the unsaturated pressure, after which the material to be treated is introduced into the first space from the third space through the reflux space. When the solid material has been subjected to the heat treatment in the first space for the desired period of time, this material may be simply quenched by moving it from the first space through the reflux space to the third space, in which latter space the temperature may be comparatively low.

The above described treatments are preferably employed to cause at least one constituent of the substance producing the unsaturated vapor to diffuse or dissolve in the material. In addition, the above described treatments are particularly suited for treating materials capable of yielding a volatile component at the treating temperature, while the unsaturated pressure may comprise said volatile component or a readily decomposing compound thereof. The vapor pressure may be adjusted to the desired value for obtaining or maintaining the stoichiometric composition of the material or a desired deviation from this composition.

In both cases, known heat treatments may be used in the first space, for example, below the melting point of the material for diffusion into or out of it, or melting treatments, for example zone melting.

In order that the invention may readily be carried out, it will now be described more fully, by way of example, with reference to the accompanying diagrammatic drawing, the single FIGURE of which is a vertical section through an apparatus for obtaining an unsaturated vapor pressure.

In the figure, reference numeral 1 denotes a vertical tube, which is closed at its lower end and open at its upper end, a lower portion 2 of the tube being arranged in a furnace 3. An upper portion 4 opens into a gas-filled container 5, the pressure in which can be controlled by not shown means. The arrangement further comprises pipes 6 through which cooling air can be blown against the wall of a portion 7 of the tube 1 above the furnace.

To obtain an unsaturated vapor of a substance in the tube portion 2 inserted in the furnace, a supply of this substance in the solid or liquid state is introduced into this tube portion, after which the gas pressure in the container 5 is adjusted to the desired value. The tube portion 2 is then gradually heated by the furnace 3 while cooling air is blown through the pipes 6. The temperature in the container 5 need not rise appreciably and may be maintained at room temperature. The substance completely evaporates and the rising vapor condenses on the wall of the tube portion 7, the condensate flowing down along the outer wall to a portion 8 of the tube adjacent the upper end of the furnace 3, in which portion the liquid condensate is heated so as to evaporate entirely. This vapor again rises to the portion 7 of the tube, in which it condenses. Thus, the substance circulates in the reflux space within the tube 1 comprising the tube portions 7 and 8 and the intermediate portion, an intense upward vapor current being maintained which raises the residual gas in the space constituted by the tube portion 2, so that this space is filled with the vapor of said substance, which is given a pressure substantially equal to the gas pressure in the container 5. The temperature in the space 2 may be adjusted by means of the furnace 3 independently of the vapor pressure of the substance, provided that this temperature is higher than the boiling point of the substance at the gas pressure prevailing in the container 5. The cooling of the rising vapor in the tube portion 7 should be sufficiently intense to enable the rising vapor to condense substantially completely.

To subject a material to a heat treatment in the unsaturated vapor of the substance, a supply of this material 9 is introduced by means of a crucible 10 suspended by a wire 11 from the container 5 into the tube portion 2 and subjected to the heat treatment for a desired period of time, after which the material may readily be quenched by pulling it up by means of the wire 11. Alternatively, a body of the material to be treated may directly be secured to the wire 11 without the use of a crucible. Since during the treatment the container 5 may be maintained at room temperature, in this container an electric motor may be used for lowering and raising the material by means of the wire 11. If desired, the material may previously be introduced into the cold tube and may be removed therefrom after cooling.

The invention will also be illustrated with reference to two examples.

*Example I*

Into the tube 1, which has a length of 30 cms. and an inner diameter of 20 mms. and is made of vitreous quartz, two gms. of pure cadmium are introduced, after which the upper end 4 is put into communication with a container 5. The air in the container and the tube is now replaced by nitrogen, and the nitrogen pressure in the container is brought to a value of 0.8 atmosphere.

A length of 10 cms. of the lower portion 2 of the tube is inserted into their furnace 3, which is then gradually heated until the temperature in the tube portion 2 is 900° C., and this may be determined by means of a not shown thermocouple. In the meantime, a cold air current is blown against the tube portion 7 situated about 13 cms. above the closed end of the tube. During warming up, the cadmium completely evaporates and condenses in the tube portion 7, from which it flows back and completely evaporates again in the tube portion 8. After warming up, the temperature in the tube portion 2 is maintained at 900° C., while the pressure in the container 5 is maintained at 0.8 atmosphere by continuous adjustment.

About 5 minutes after the temperature of 900° C. is reached in the tube portion 2, a crystal of cadmium telluride, CdTe, containing 5 times $10^{16}$ atoms of gold per cubic centimeter, is brought from the container 5 into the space 2 by means of the wire 11 and heated for about 3 hours. If during this treatment an excessive amount of cadmium is deposited at the upper end of the tube 1 above the portion 7, this solid cadmium may again be melted, for example by means of local heating, the molten cadmium flowing back to the cooled portion 7. If by gradual escape of cadmium the amount of cadmium taking part in the reflux process threatens to become insufficient to maintain a strong vapor current, a boat containing pure cadmium may be introduced from the container into the tube portion 8 and subsequently be lifted therefrom when a sufficient amount of cadmium from this boat has evaporated to increase the cadmium circulation in the reflux space.

When the cadmium telluride crystal has been heated to 900° C. for 2 hours, it is pulled up from the space 2 and rapidly cooled to room temperature in the container 5. After the treatment, the crystal is found to be of n-conductivity.

*Example II*

In the manner described in Example I, cadmium vapor of 900° C. is produced in the space 2, however, the nitrogen pressure in the container 5 is now maintained at 0.4 atmosphere. In a manner similar to that described in Example I, a cadmium telluride crystal containing 5 times $10^{16}$ atoms of gold per cc. is heated in the space 2 for 3 hours and then quenched. After the treatment, the crystal is found to be of p-conductivity.

In a modification of the above examples, a crystal obtained by the method described in Example I may be subjected to a treatment similar to that described in Example II for a short period of time, for example 5 minutes, in order to obtain a p-conductivity zone at the surface of the n-conductivity crystal, while alternatively a crystal obtained by the method described in Example II may be subjected to a treatment similar to that described in Example I for a short period of time in order to obtain a n-conductivity zone at the surface of the p-conductivity crystal.

Although the above-described examples both relate to the treatment of cadmium telluride in cadmium vapour, many other materials may be similarly treated in unsaturated vapours of many other substances. Thus, cadmium sulphide may be treated in cadmium or sulphur vapour to obtain cadmium sulphite having good conductivity and high resistivity, respectively. Both cadmium telluride and cadmium sulphide may be employed in semiconductor devices, in particular in photo-electric cells.

The invention may also be used for doping a semiconductive material, for example silicon, with phosphorus or antimony, either by dissolving from the vapour of these substances in molten silicon or by diffusion into solid silicon from this vapour.

Furthermore, by the method according to the invention potassium chloride crystals may be doped with an excess of potassium, the resulting violet crystals absorbing in the green spectrum. These crystals may be used as filters for visible light.

What is claimed is:

1. A method of heat treating material is the unsaturated controlled vapor pressure of a substance having a triple point, which vapor pressure is higher than the triple point pressure of said substance, in a first space, comprising providing a second space communicating at one end with the first space and communicating at another end with a third space, providing in the third space a gas atmosphere at a pressure substantially equal to the pressure of the substance it is desired to establish in the first space and above the triple point pressure of the substance, maintaining the first space at a temperature above the boiling point of the substance at the controlled pressure to produce an unsaturated vapor which enters the second space and travels toward the third space, maintaining a region of the second space adjacent the third space at a temperature at which the vapor of the substance substantially entirely condenses and causing the condensate thus formed to flow back through the second space toward the first space, maintaining a region of the second space adjacent the first space at a temperature at which the returning condensate of the substance substantially entirely revaporizes, whereby the substance circulates in the second space by continuous evaporation and reflux, and the first space becomes filled with the unsaturated vapor of the substance at the desired pressure substantially equal to the gas pressure in the third space, and introducing the material to be treated into the said first space.

2. A method as set forth in claim 1 wherein the first and second spaces constitute lower and upper regions, respectively, of a vertical tube closed at the bottom and open at the top, the lower region of the tube is heated, and the upper region of the tube is cooled.

3. A method of heat-treating material in the unsaturated controlled vapor pressure of a substance having a triple point, which vapor pressure is higher than the triple point pressure of said substance, comprising providing a first space, providing a second space with vertically-extending walls communicating at its lower end with the first space and communicating at its upper end with a third space, providing in the third space a gas atmosphere at a pressure substantially equal to the pressure of the substance it is desired to establish in the first space and above the triple point pressure of the substance, maintaining the first space at a temperature above the boiling point of the substance at the controlled pressure to produce an unsaturated vapor which rises and enters the second space and travels toward the third space, maintaining a region of the second space adjacent the third space at a temperature at which the vapor of the substance substantially entirely condenses and causing the thus formed condensate to flow downward back through the second space toward the first space, maintaining a region of the second space adjacent the first space at a temperature at which the returning condensate of the substance substantially entirely revaporizes, whereby the substance circulates in the second space by continuous evaporation and reflux and the first space becomes filled with the unsaturated vapor of the substance at the desired pressure substantially equal to the gas pressure in the said third space, and introducing the material to be treated into the said first space.

4. A method as set forth in claim 3 wherein the material to be heat-treated is introduced into the first space by passage through the third and second spaces, and is removed from the first space by passage through the second and third spaces.

5. A method as set forth in claim 3 wherein the controlled pressure is at least 0.1 mm. of mercury and at least 10 times the vapor pressure of the substance at its melting point.

6. A method as set forth in claim 3 for treating semiconductive materials, wherein the solid semiconductive material is heated in the first space and the vapor of the substance is caused to diffuse therein.

7. A method as set forth in claim 3 for treating semiconductive material, wherein the semiconductive material is melted in the first space and the vapor of the substance dissolved in the melt.

8. A method as set forth in claim 3 wherein the material to be treated contains a volatile component constituting the substance producing the unsaturated vapor.

References Cited in the file of this patent

UNITED STATES PATENTS

| | | |
|---|---|---|
| 2,715,606 | Grote | Aug. 16, 1955 |
| 2,810,667 | Hohn et al. | Oct. 22, 1957 |
| 2,827,403 | Hall et al. | Mar. 18, 1958 |
| 2,865,738 | Muller | Dec. 23, 1958 |
| 2,933,384 | Welker et al. | Apr. 19, 1960 |

OTHER REFERENCES

Wilke: "Sublimation: Its Applications in Chemical Processing," Chemical Industries, July 1948, pages 34 et seq.

UNITED STATES PATENT OFFICE
CERTIFICATE OF CORRECTION

Patent No. 3,113,056 December 3, 1963

Cornelis Zeger van Doorn

It is hereby certified that error appears in the above numbered patent requiring correction and that the said Letters Patent should read as corrected below.

Column 1, line 48, for "which" read -- while --; line 64, after "heat" insert -- to --; column 2, line 50, for "temperatrue" read -- temperature --; column 5, line 39, for "is" read -- in --.

Signed and sealed this 21st day of April 1964.

(SEAL)
Attest:

ERNEST W. SWIDER

Attesting Officer

EDWARD J. BRENNER

Commissioner of Patents